United States Patent
Sato

(10) Patent No.: US 7,746,049 B2
(45) Date of Patent: Jun. 29, 2010

(54) POWER SUPPLY DEVICE AND RECORDING APPARATUS

(75) Inventor: Takashi Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/056,114

(22) Filed: Mar. 26, 2008

(65) Prior Publication Data

US 2008/0238388 A1    Oct. 2, 2008

(30) Foreign Application Priority Data

Mar. 30, 2007    (JP)  ............................. 2007-091033

(51) Int. Cl.
G05F 1/46 (2006.01)
G05F 1/56 (2006.01)
(52) U.S. Cl. ...................... 323/288; 320/166
(58) Field of Classification Search ................ 323/220, 323/223, 229, 265, 282, 288, 351; 320/166
See application file for complete search history.

(56) References Cited

U.S. PATENT DOCUMENTS 4,792,746 A * 12/1988 Josephson et al. ........... 323/290
5,216,586 A * 6/1993 Saito ........................... 363/49
7,071,668 B2 * 7/2006 Sasaki ......................... 323/290
7,279,874 B2   10/2007 Kazunori

FOREIGN PATENT DOCUMENTS

JP    2005-168235 A    6/2005

* cited by examiner

Primary Examiner—Gary L Laxton
(74) Attorney, Agent, or Firm—Canon U.S.A., Inc. I.P. Division

(57) ABSTRACT

A power supply device includes a DC-DC converter configured to regulate an output voltage based on an externally input instruction, and a discharge circuit connected to an output capacitor of the DC-DC converter, wherein the discharge circuit includes a switch element configured to switch between a conductive state and a nonconductive state according to an instruction, and a capacitor-resistor (C-R) circuit configured to charge electric charge accumulated in the output capacitor of the DC-DC converter when the switch element is conductive and to discharge the electric charge to ground when the switch element is nonconductive.

10 Claims, 14 Drawing Sheets

FIG.12
PRIOR ART

| RESISTANCE VALUE | REQUIRED DISCHARGE PULSE WIDTH | RESISTOR APPLIED ELECTRIC POWER | REQUIRED RATED POWER (FROM FIG. 13) |
|---|---|---|---|
| 10Ω | 0.514ms | 57.60W | 0.5W |
| 15Ω | 0.771ms | 38.40W | 0.5W |
| 22Ω | 1.131ms | 26.18W | 0.5W |
| 33Ω | 1.696ms | 17.45W | 0.5W |
| 47Ω | 2.416ms | 12.26W | 0.5W |
| 68Ω | 3.495ms | 8.47W | 0.25W |
| 100Ω | 5.140ms | 5.76W | 0.25W |
| 150Ω | 7.709ms | 3.84W | 0.25W |
| 220Ω | 11.307ms | 2.62W | 0.17W |

POWER SUPPLY DEVICE AND RECORDING APPARATUS

BACKGROUND OF THE INVENTION

1. Field of the Invention

The present invention relates to a power supply device with a DC-DC converter and a recording apparatus using the power supply device.

2. Description of the Related Art

A step-down DC-DC converter of pulse width modulation (PWM) switching type is used for power supply to a load of a drive source or an electric circuit in electronic apparatuses. The step-down DC-DC converter of PWM switching type generates a predetermined constant output voltage by performing constant value control while comparing a target voltage value for setting an output voltage with a feedback voltage value from the output voltage.

A DC-DC converter that controls an output voltage to be supplied to a load controls the output voltage by changing a target voltage value for feedback constant voltage control according to a signal from an external control unit or an external electronic apparatus. Alternatively, the DC-DC converter changes a feedback voltage value by adding current to a feedback voltage from the output voltage, thereby controlling the output voltage.

Operation of a conventional step-down DC-DC converter of PWM switching type for controlling an output voltage is described below.

FIG. 9 illustrates a basic configuration of the conventional step-down DC-DC converter 50a. The DC-DC converter 50a includes a digital to analog (D-A) converter 201 and sets a value corresponding to an output voltage value targeted by a control unit 30 to the D-A converter 201. The DC-DC converter 50a operates to maintain the output voltage value at the target voltage value so as to be stable at the target voltage. The DC-DC converter 50a changes a value to be set to the D-A converter 201, thereby changing a voltage value to be maintained.

In the step-down DC-DC converter 50a of PWM switching type illustrated in FIG. 9, an input voltage VHin supplied from a power supply unit (not-shown) is input to a switching element Q101. Then, an alternate current output converted by the switching element Q101 and a diode D101 is output via a reactor L101, so that an output voltage VH is supplied to a load 2-1.

A capacitor C001 is connected to a direct current side of the switching element Q101 and a capacitor C002 is connected to an alternate current side of the switching element Q101 via the reactor L101. The reactor L101 and the capacitor C002 constitute a smoothing circuit.

An output voltage VH detected at an output terminal of the smoothing circuit is divided by a resistor R101 and a resistor R102. The divided voltage (feedback voltage) is input to an error amplifier 202 included in a PWM control circuit (PWM control IC) 200. The PWM control circuit 200 performs feedback control to make the output voltage constant.

The circuit for performing constant voltage feedback control includes the PWM control circuit (PWM control IC) 200, which includes the error amplifier 202, a PWM comparator 203, and a triangular-wave signal generator 205, resistors R103, R104, R105, and R106, and a capacitor C003.

A discharge circuit unit H includes a switch element Q01 and a resistor R01.

One side of the switch element Q01 is connected to ground HGND and the other side of the switch element Q01 is connected to a VH output via the resistor R01. A control terminal of the switch element Q01 is connected to a control unit 30.

The switch element Q01 is turned ON or OFF in response to a DCHRG signal from the control unit 30. For example, the switch element Q01 becomes conductive when the DCHRG signal is at level H (high) and becomes nonconductive when the DCHRG signal is at level L (low).

Now, a control operation for regulating an output voltage is described below. The error amplifier 202 receives a reference voltage Vref supplied from the D-A converter 201 and a feedback voltage of the output voltage VH supplied from the resistors R101 and R102.

An output signal from the error amplifier 202 is input to the PWM comparator 203, which determines a PWM duty ratio. The PWM comparator 203 performs a comparison between an output signal from the error amplifier 202 and a triangular-wave signal output from the triangular-wave signal generator 205. The output from the PWM comparator 203, as an output signal from the PWM control circuit (PWM control IC) 200, is used to control the switching element Q101 via a metal-oxide semiconductor (MOS) drive circuit 204.

The resistors R105 and R106 and the capacitor C003, which are connected between the inverting terminal and output terminal of the error amplifier 202, constitute an exemplary phase compensation circuit.

The control unit 30, which is included in an electronic apparatus, outputs a setting signal DA_S to the D-A converter 201. The resistors R103 and R104 divide the reference voltage Vref output from an output terminal Aout of the D-A converter 201 and input the divided reference voltage Vref' to the inverting terminal of the error amplifier 202.

The D-A converter 201 regulates a voltage of the Vref terminal based on a digital value of the setting signal DA_S and supplies the voltage to the inverting terminal of the error amplifier 202 as a voltage Vref' divided by the resistors R103 and R104.

If the D-A converter 201 is an 8-bit D-A converter, the reference voltage Vref can be regulated in $2^8$ stages (two to the eighth power stages), namely, in 256 stages.

A non-inverting terminal of the error amplifier 202 is connected to a voltage dividing point at which the voltage between the output voltage VH of the DC-DC converter 50a and the ground is divided by the resistors R101 and R102. The output voltage VH is expressed by equation (1).

$$VH = Vref \cdot (R101 + R102)/R102 \qquad (1)$$

The PWM comparator 203 performs feedback control to regulate the value of the output voltage VH to a target voltage value. The output voltage VH can be regulated in 256 stages between a maximum voltage VHmax and a minimum voltage VHmin.

An exemplary DC-DC converter in which an output voltage range of 24 V-19 V can be regulated in two to the eighth power (256) stages by using an 8-bit D-A converter is described below. In this case, a change in voltage corresponding to one bit of control data for the D-A converter is expressed by the following equation:

$$(24\,V - 19\,V)/2^8 \approx 19.5\,mV$$

The PWM control type DC-DC converter, in which the diode D101 is located at a low side between the switching element Q101 and the ground (HGND) as illustrated in FIG. 9, has a rather low-cost configuration. When the DC-DC converter having the above-described configuration raises an output voltage, the DC-DC converter changes the target voltage value (or changes the feedback voltage value). For example, the DC-DC converter increases an on-duty width of a MOS-FET at a high side. Accordingly, electric power is supplied from an input side to allow the output voltage to rise. A time period required for raising the output voltage to a target voltage value is determined depending on a response time of a feedback loop of the DC-DC converter.

On the other hand, in decreasing the output voltage, the output voltage VH of the DC-DC converter cannot drop immediately in response to a change of the reference voltage Vref of the D-A converter. This is because an output capacitor accumulates electric charge at a voltage generated before the output voltage drops and there is only a voltage-dividing resistor that can discharge electric charge accumulated in the output capacitor.

The voltage-dividing resistor, which determines a feedback voltage, generally employs a constant between several kΩ and several tens of kΩ so as not to degrade power conversion efficiency of the DC-DC converter. Accordingly, current flowing in the voltage-dividing resistor is several mA at the most.

Therefore, upon a light load, for example, in lowering the output voltage while a load current is 0 A, there is no path for discharging excessive electric charge having been accumulated in the output capacitor. Accordingly, it is conventionally necessary to configure a discharge circuit unit H, in which the switch element Q01 and the resistor R01 are connected in series with the output terminal as illustrated in FIG. 9, to enable discharge of the excessive electric charge accumulated in the output capacitor to the ground HGND to lower the output voltage.

Japanese Patent Application Laid-Open No. 2005-168235 discusses a configuration of the discharge circuit unit H, which discharges electric charge of a capacitor at the output terminal when lowering the output voltage.

In Japanese Patent Application Laid-Open No. 2005-168235, a signal for driving the discharge circuit unit H has a constant pulse width independent from a setting value of the output voltage so as to step down the output voltage to a target voltage value within a defined time period in throughout a voltage range required as the output voltage of the DC-DC converter.

In the above-described DC-DC converter, which regulates the output voltage, a control unit preliminarily determines a pre-set voltage. For example, the DC-DC converter has a function of regulating the output voltage to perform energy correction with respect to variation of parts at the load side and environmental variation.

The above-described DC-DC converter, which supplies a power supply voltage to an electronic apparatus, is required to change the output voltage in a short time period in response to a command from the control unit while the DC-DC converter is outputting a voltage of a certain value.

Operation of the DC-DC converter is described with reference to waveforms illustrated in FIG. 10 with regard to a case where the control unit outputs a setting signal to change the output voltage to an output voltage V1 (Vo>V1) when the DC-DC converter is outputting a certain output voltage Vo.

Prior to receiving the setting signal (DA_S) for changing the output voltage, if a load current of the DC-DC converter is 0 A, the DC-DC converter can maintain the output voltage level if the DC-DC converter is supplied with an amount of electric power corresponding to that having been lost in the DC-DC converter. Therefore, the switching element Q101 is in a state of OFF operation, namely, duty 0% operation, almost throughout the switching cycle.

If the DC-DC converter receives, from the control unit 30, the setting signal (DA_S) for changing the output voltage from Vo to V1 (Vo>V1) between time t0 and time t1 illustrated in FIG. 10, an output value from the D-A converter 201 becomes smaller (not shown). Accordingly, the control unit 30 changes the target setting voltage of the DC-DC converter.

After the control unit 30 sets the target setting voltage of the DC-DC converter, the control unit 30 transmits a DCHRG signal (discharge command) of a preliminary set constant pulse width for a time interval between time t2 and time t4.

When the switch element Q01 receives the DCHRG signal at level H from the control unit 30 at time t2, the switch element Q01 becomes conductive. Since the load current is not extracted from the output between time t1 and time t4, the VH voltage remains at Vo between time t1 and time t2 before receiving the DCHRG signal. When the switch element Q01 becomes conductive at time t2, discharge current flows to the ground HGND via the resistor R01 to allow a potential of the capacitor C002 (VH) to drop from Vo to the target voltage V1, so that the output voltage reaches the target voltage V1 at time t3.

The output voltage in a time interval between time t2 and time t3 is expressed by equation (2):

$$V1 = Vo \cdot \exp(-t/(C002 \cdot R01)) \qquad (2)$$

The current flowing in the resistor R01 becomes I R01=V1/R01 according to the voltage V1.

Since the control unit 30 outputs the pulse width of the DCHRG signal between time t2 and time t4, the output voltage immediately drops to the target voltage V1 before a time interval between time t3 and time t4. At that time, the DC/DC converter is still performing constant voltage control at the target voltage V1, the output voltage V1 is continuously applied to the resistor R01.

The switch element Q01 is turned OFF when the DCHRG signal reaches level L at time t4, thus resulting in terminating a series of VH modulation control. In the above description, it is assumed that an on-resistance of the switch element Q01 is 0Ω.

The output voltage change range (output voltage regulating range) of the DC-DC converter illustrated in FIG. 9 is between the maximum value VHmax and the minimum value VHmin. In stepping down the output voltage VH from a certain initial voltage Vo to the target voltage V1, the pulse width required to step down the output voltage VH to the target voltage V1 can be expressed by equation (3). Here, a capacitance of the output capacitor C002 is C002 [μF], a discharge resistance value is R01 [Ω], and the on-resistance of the switch element Q01 of the discharge circuit unit H is ignored.

$$t = -C002 \cdot R01 \cdot LN(V1/Vo) \qquad (3)$$

For example, 220 μF of the capacitance and 100Ω of the discharge resistance value R01 are applied to the above formula, a pulse width of 0.936 ms is required, for example, when the output voltage is lowered by 1.0 V, namely, from 24 V to 23 V. Further, a pulse width of 1.128 ms is required when the output voltage is lowered by 1.0 V, namely, from 20 V to 19 V.

In view of equation (3), it is understood that, as a potential difference between the initial voltage Vo and the target voltage V1 becomes larger, a time period required for stepping down the output voltage VH becomes longer. It is also understood that, as the capacitance of the output capacitor C002 becomes larger, the pulse width for driving the discharge circuit unit H becomes longer.

As described above, a conduction time of the discharge circuit unit H for stepping down a constant voltage varies with an initial setting and a target voltage if the output capacitor C002 is defined.

For example, a DC-DC converter that is capable of changing an output voltage between the maximum value VHmax of 24 V and the minimum value VHmin of 19 V requires the longest discharge time to lower the VH voltage from 24 V to 19 V.

Here, if this condition is applied to the above circuit constant, the DC-DC converter requires a discharge time of 5.132 ms to lower the voltage by 5 V, namely, from 24 V to 19 V. Thus, the DC-DC converter drives the discharge circuit unit H at a constant pulse width of 5.132 ms to change (regulate) the VH voltage output range to the target voltage.

In other words, the DC-DC converter requires a pulse width of 5.132 ms to lower the voltage to the target voltage value within the time period defined by the constant pulse width in the changeable range of the DC-DC converter.

A DC-DC converter discussed in Japanese Patent Application Laid-Open No. 2005-168235 is described below. The DC-DC converter continuously drives the discharge circuit unit H at a constant pulse width to lower the output voltage to a target voltage value within a predetermined time period in the output voltage range of the DC-DC converter.

If a DC-DC converter in which the output voltage range between 24 V and 19 V can be regulated by an 8-bit D-A converter into $2^8$ (256) stages is exemplified as the DC-DC converter configured to regulate the output voltage, a voltage change for one bit of the D-A converter is expressed by the following formula:

$$(24 V - 19 V)/2^8 \approx 19.5 \text{ mV}$$

In other words, the DC-DC converter drives the discharge circuit unit H at the constant pulse width of 5.132 ms to step down the output voltage both in the case of stepping down the output voltage of the DC-DC converter from 24 V to 19 V and in the case of stepping down the output voltage of the DC-DC converter from 24 V by 19.5 mV.

Here, a maximum time period t for stepping down the output voltage by driving the discharge circuit unit H with a constant pulse width throughout the whole output voltage range can be expressed by equation (4).

$$t = -C002 \cdot R01 \cdot LN(VHmin/VHmax) \tag{4}$$

Consequently, the pulse width of the DCHRG signal for stepping down the set voltage value is determined according to a conduction time that satisfies a variation width (ΔVHmax) based on the maximum value (VHmax) and the minimum value (VHmin) of the voltage range. Namely, in this example, it is a conduction time of 5.132 ms that satisfies a change of the voltage from 24 V to 19 V.

Electric power to be applied to the discharge resistor is described below. As illustrated in FIG. 9, the output voltage of the DC-DC converter, configured to regulate the output voltage, has an output voltage width between the maximum value VHmax and the minimum value VHmin. Therefore, the voltage value applied to the discharge resistor upon conduction of the switch element Q01 is also a voltage value between the maximum value VHmax and the minimum value VHmin. However, the applied voltage is not always constant because of the DC-DC converter configured to modulate the output voltage. For example, in the case of a DC-DC converter capable of changing the output voltage between 24 V and 19 V, the voltage between 24 V and 19 V may be applied to the discharge resistor.

Here, a case where the discharge resistance is 100Ω is described. When the output voltage is 24 V, electric power continuously applied to the discharge resistor is 5.76 W. When the output voltage is 19 V, electric power continuously applied to the discharge resistor is 3.61 W. The continuously applied electric power in the case where the output voltage is 24 V becomes about 1.6 times as a case where the output voltage is 19 V.

In the discharge circuit unit H, including the switch element and the resistor connected in series, the output voltage VH is continuously applied to the discharge resistor while the switch element of the discharge circuit unit H is conductive even if the output voltage drops and reaches the target value during a step-down process of the output voltage. Accordingly, a constant discharge current continues to flow in the discharge resistor, namely, a constant electric power is continuously applied to the discharge resistor.

In a typical characteristic of the resistor, a limited electric power at one-pulse is defined by pulse limiting electric power curves as illustrated in FIG. 11. FIG. 11 illustrates a mere example of pulse limiting electric power curves of a lead resistor, namely, pulse limiting electric power curves of five types of rated power between 0.17 W and 2 W and resistor sizes. The characteristic is defined for each respective resistor regardless of types of resistors (for example, metal film, carbon, oxidative metal, and fusing resistor) or manufacturers thereof.

In the typical resistor, as the electric power application time becomes longer, the limiting electric power decreases more. Also, as the rated power becomes higher, the resistor size becomes larger and the limiting value of the pulse limiting electric power curve becomes high. However, if the resistor size becomes larger, there is required a larger installation space, thus resulting in higher cost.

If the output capacitance C002 and the output voltage range (VHmax, VHmin) are determined according to formula (4), the time period t required for stepping down the output voltage is determined according to the resistance value of the discharge resistor.

The maximum electric power is applied to the resistor at a time when the VH voltage for one bit of the D-A converter (19.5 mV) is stepped down from the maximum voltage VHmax.

FIG. 12 illustrates a calculating result of a discharge time required for stepping down the voltage in the whole voltage range and electric power applied to the discharge circuit unit H for respective different constants of the discharge resistor R01.

A required discharge time is represented by a pulse width value in FIG. 12 calculated with the proviso that the maximum value VHmax is 24 V, the minimum value VHmin is 19 V, and the capacitor C002 is 220 μF in formula (1), for respective resistance values of the resistor R01 between 10Ω and 220Ω.

For the ease of calculation, the resistor applied electric power is a value of electric power applied to the resistor when the discharge circuit unit H is made conductive while the output voltage remains at 24 V. That is, the applied electric power is calculated by 24 V×24 V/R01 to obtain the maximum electric power to be applied to the resistor.

FIG. 13 is a graph obtained by plotting the result illustrated in FIG. 12 into pulse limiting electric power curves. As apparent from FIGS. 12 and 13, as the resistance value becomes larger, the applied electric power becomes smaller, thus resulting in enabling the use of a resistor having a smaller rated power. However, it is seen that the conduction time of the discharge circuit unit H, namely, a pulse width required for driving the discharge circuit unit H for stepping down the output voltage, is elongated.

Further, as the resistance value becomes smaller, the output voltage drops in a short time period. However, the electric power to be applied to the resistor becomes larger. Therefore, the use of such a resistor having both a large rated power and a large resistor size is required.

As understood from the above description, it is required to make the resistance value of the electric discharge resistor smaller to drive the discharge circuit always at a constant pulse to step down the output voltage to the target output voltage value within a predetermined time period in the output voltage range of the DC-DC converter.

However, in using the resistor within the pulse limiting electric power curve, a resistor having a large rated power and a large resistor size is required. Also, in using a resistor requiring a small installation space, the electric power to be applied to the resistor is required to be limited within the pulse limiting electric power curve, such that the time period for stepping down the output voltage to the target value tends to take time in a conventional configuration.

Considering the above-described point, in order to avoid increase of the sizes of the rated power and, thus, a power source unit, it is required to shorten the discharge time by connecting small-sized rated power resistors in series to reduce the electric power to be applied to the resistors. Thus, a problem of increased cost arises.

SUMMARY OF THE INVENTION

The present invention is directed to a power supply device with a simple and inexpensive configuration that is capable of controlling an output according to an externally input control signal as required.

According to an aspect of the present invention, a power supply device includes a DC-DC converter configured to regulate an output voltage based on an externally input instruction, and a discharge circuit connected to an output capacitor of the DC-DC converter, wherein the discharge circuit includes a switch element configured to switch between a conductive state and a nonconductive state according to an instruction, and a capacitor-resistor (C-R) circuit configured to charge electric charge accumulated in the output capacitor of the DC-DC converter when the switch element is conductive and to discharge the electric charge to ground when the switch element is nonconductive.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

FIG. 12 is a table illustrating a required discharge pulse width and a maximum electric power to be applied to the discharge resistor.

DETAILED DESCRIPTION OF THE EMBODIMENTS

Various exemplary embodiments, features, and aspects of the invention will be described in detail below with reference to the drawings.

First Exemplary Embodiment

Figure 6:
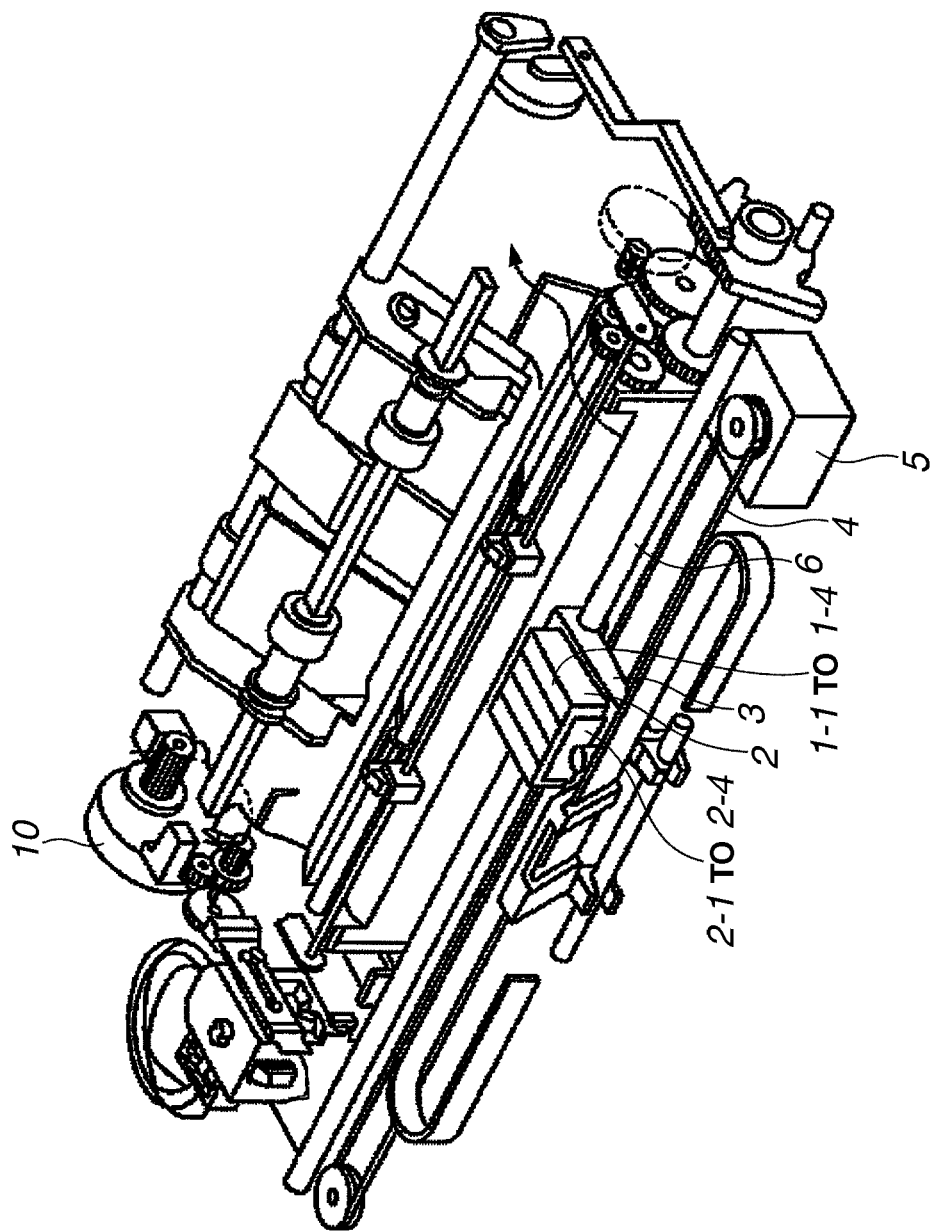
FIG. 6 is a perspective view of an example recording apparatus with the DC-DC converter according to an exemplary embodiment of the present invention.
Figure 7:
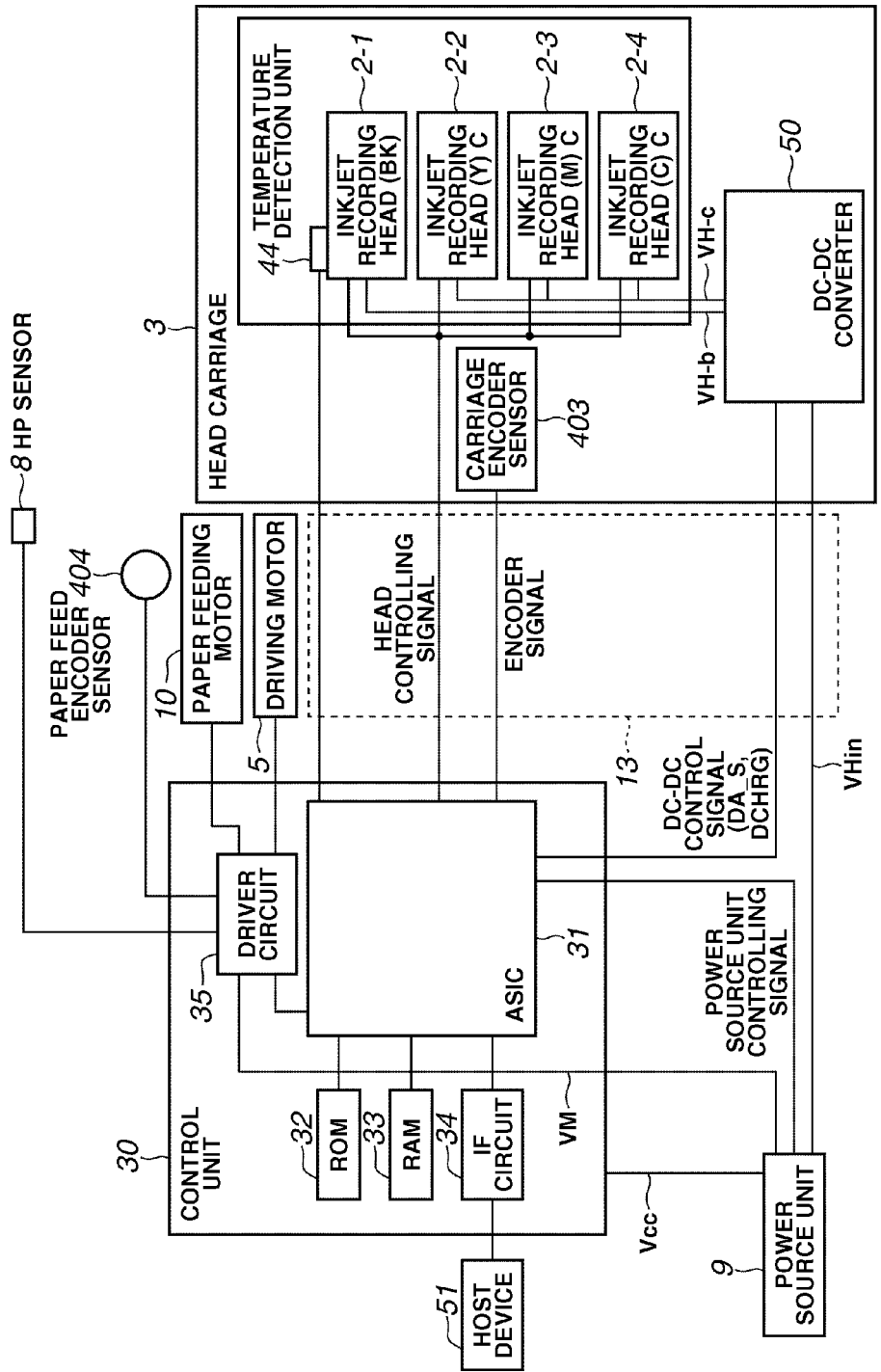
FIG. 7 is a block diagram illustrating an example control structure of the recording apparatus according to an exemplary embodiment of the invention.

FIGS. 6 and 7 illustrate an example configuration of a recording apparatus with a power supply device (DC-DC converter) according to an exemplary embodiment of the invention.

The recording apparatus is of an inkjet recording type. As illustrated in FIG. 6, the recording apparatus includes an inkjet recording head unit configured to discharge ink. The inkjet recording head unit includes a recording head 2-1 for black (Bk) ink, a recording head 2-2 for yellow (Y) ink, a recording head 2-3 for magenta (M) ink, and a recording head 2-4 for cyan (C) ink. The recording heads 2-1 to 2-4 are configured integrally with ink tanks 1-1 to 1-4, respectively.

The recording heads 2-1 to 2-4 and ink tanks 1-1 to 1-4 are mounted on a head carriage 3 together with an optical home position sensor (hereinafter referred to as an "HP sensor") 8 illustrated in FIG. 7) and a DC-DC converter 50 (FIG. 7).

The head carriage 3 is coupled to a portion of a driving belt 4, which transmits a driving force of a carriage driving motor 5, and is mounted movably with respect to guide shafts 6 located in parallel with a scanning direction.

The head carriage 3 can reciprocate throughout a width of recording paper fed from a paper feeding device (not shown) on a platen (not shown) located opposed to a discharge surface of the inkjet recording head (2-1 to 2-4) according to a driving force from the carriage driving motor 5, thus performing recording on the recording paper. The paper feeding motor 10 is controlled according to a signal from a paper feed encoder sensor 404 (see FIG. 7).

The carriage driving motor 5 is controlled such that a discharge position of the recording head installed in the head carriage 3 is controlled precisely according to a signal from a carriage encoder sensor 403 (see FIG. 7) detecting an encoder slit (not shown) located in parallel with the guide shaft 6.

Each of the above-described inkjet recording heads 2-1 to 2-4 includes a plurality of head nozzle orifices located side by side on the discharge surface opposed to the recording surface of the recording paper. Each head nozzle orifice is configured to discharge ink and has a thin pipe shape. Each inkjet recording head integrally includes a heater adjacent to the head nozzle orifice to apply discharge energy to ink supplied from each of the ink tanks 1-1 to 1-4, which are integrated with the corresponding heads.

The head nozzle orifices of each of the recording heads 2-1 to 2-4 are arranged in a perpendicular direction with respect to a scanning direction of the head carriage 3, and the four recording heads 2-1 to 2-4 are arranged side by side in the carriage scanning direction.

The HP sensor 8 mounted on the head carriage 3 is used to determine a reference position (carriage home position) in the scanning direction during a recording operation by detecting a projection 12 for detecting the reference position when the head carriage 3 moves on the guide shafts 6 in an initial operation.

The above-described inkjet printing apparatus receives, with its print control unit (not shown but described below), data such as an image information control command input by an external host device and rasterizes the received data into image data of each color. Then, the inkjet recording apparatus transmits the rasterized inkjet data to the recording heads 2-1 to 2-4 and causes the head carriage 3 to perform a scanning operation to control a series of printing operations for discharging ink at a required timing.

The control unit 30 and the head carriage 3 are connected to each other via a flexible cable 13 and are supplied with various signals and electric power required for the DC-DC converter 50.

FIG. 7 illustrates an example control structure of the recording apparatus illustrated in FIG. 6. The control unit 30 illustrated in FIG. 7 includes an application specific integrated circuit (ASIC) 31, a read-only memory (ROM) 32 and a random access memory (RAM) 33 serving as storage units, and an interface circuit 34. The ASIC 31 includes a central processing unit (CPU) to control the recording apparatus.

The interface circuit 34 serves to communicate with a host device 51. The control unit 30 further includes a driver circuit 35, which is configured to drive the carriage driving motor 5 and a paper feeding motor 10. The driver circuit 35 drives the motors 5 and 10 based on information from the home position (HP) sensor 8 and the encoder 403 installed on the head carriage 3. The ASIC 31 includes a logical circuit for performing various control operations with the driver circuit 35.

The ASIC 31 further includes a head control unit (not shown) configured to control discharge timing and driving of the inkjet recording heads 2-1 to 2-4.

The carriage driving motor 5 can include, for example, a DC motor. The ASIC 31 transmits a signal for the carriage driving motor 5 to the driver circuit 35 to move the head carriage 3. At the same time, the ASIC 31 manages the position of the head carriage 3 based on the number of operation signals from the reference position in the scanning direction and a signal from the carriage encoder sensor 403.

When the head carriage 3 moves to reach a place where the recording heads 2-1 to 2-4 installed on the head carriage can discharge ink, the ASIC 31 controls the head carriage 3 to discharge ink.

The ASIC 31, which includes a CPU, is configured to control the entire operation of the inkjet recording apparatus according to a program preliminarily stored in the ROM 32 or a control command input from the host device 51 via the interface circuit 34.

The ROM 32 stores a program for operating the ASIC 31, various table data required for controlling the recording head unit, and character data for generating character data.

The interface circuit 34 serves to input and output control commands and control data for controlling the inkjet recording operation to/from the host device 51.

The RAM 33 includes a work area for the ASIC 31 for computation or an area for temporarily storing recording data and control code input from the host device 51 via the interface circuit 34. The RAM 33 further includes a print buffer for storing recording data after rasterizing the recording data into bit-mapped data corresponding to nozzles of the recording head unit.

A power source unit 9 generates a voltage Vcc, a voltage VM, and a voltage VHin. The power source unit 9 supplies the voltage Vcc to the control unit 30. The power source unit 9 supplies the voltage VM to the driver circuit 35, the print paper feeding motor 10, and the carriage driving motor 5, respectively. The power source unit 9 supplies the voltage VHin to the DC-DC converter 50.

A temperature detection unit 44 is configured to detect the temperature of the recording head unit and is located near the nozzle heater of each of the recording heads 2-1 to 2-4 to detect the temperature of each nozzle heater of the corresponding head.

The temperature detection unit 44 includes a filter circuit (not shown) for eliminating noise components, which may be induced to and superposed on the temperature data. The detected analogue voltage value of the temperature data of the recording head unit is supplied to an A-D converter (not shown) to be converted from an analog voltage value into a digital value, which is then supplied to the ASIC 31.

The filter circuit is a band limiting circuit for eliminating noise components induced to and superposed on the temperature data transmitted via the flexible cable 13, which connects the control unit 30 with the movable head carriage 3. With the filter circuit, noise components propagated from high-frequency signals, such as a clock signal and a driving signal, from the control unit 30 and superposed on the temperature data can be eliminated from the temperature data. The filter circuit can include a low-pass filter having a resistor and a capacitor.

During a printing operation, the temperature of ink residing in an ink flow path within the recording head unit before being foamed and discharged also rises according to the temperature rise of the recording head unit. Therefore, a temperature difference $\Delta T$ between a temperature at which ink is discharged from the recording head unit and a temperature at which ink transits to film boiling, which are detected by the temperature detection unit 44, differs according to the temperature of the recording head unit. Accordingly, if the temperature of ink differs, ink foaming energy for discharging ink differs. Thus, energy control is required for a stable ink discharge. Taking the above into consideration, the output voltage value of the DC-DC converter 50 is changed by a value $\Delta V$ to supply energy corresponding to the temperature difference $\Delta T$ to the recording head unit.

Figure 1:
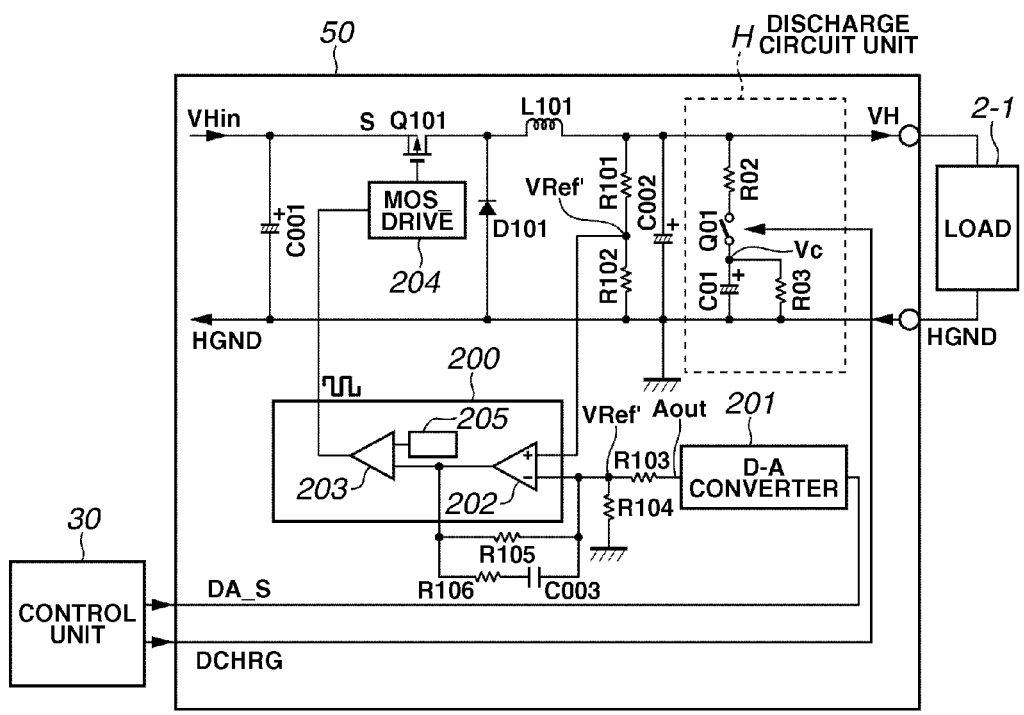
FIG. 1 is a circuit diagram of an example DC-DC converter according to an exemplary embodiment of the present invention.

FIG. 1 illustrates an example configuration of a power supply device of the above-described printing apparatus, namely, a configuration of the DC-DC converter 50. The power supply device illustrated in FIG. 1 acts as a step-down DC-DC converter of PWM switching type, which regulates an output voltage according to a control instruction (setting signal) from a control unit.

Figure 9:
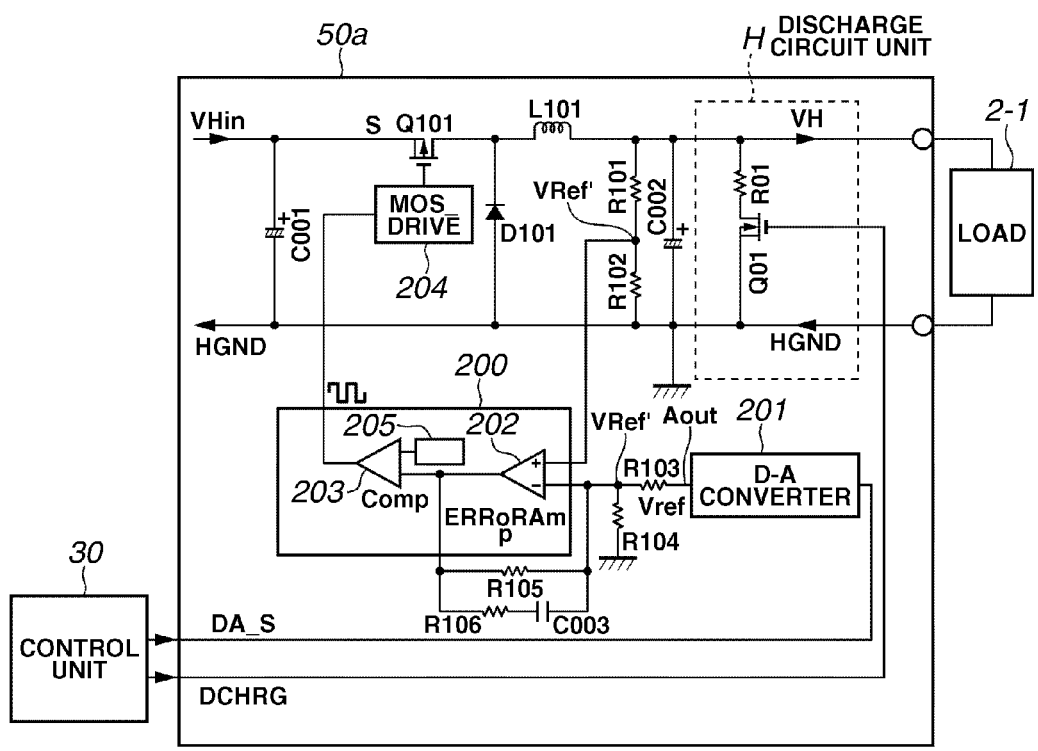
FIG. 9 is a circuit diagram illustrating a configuration of a conventional DC-DC converter.
Figure 10:
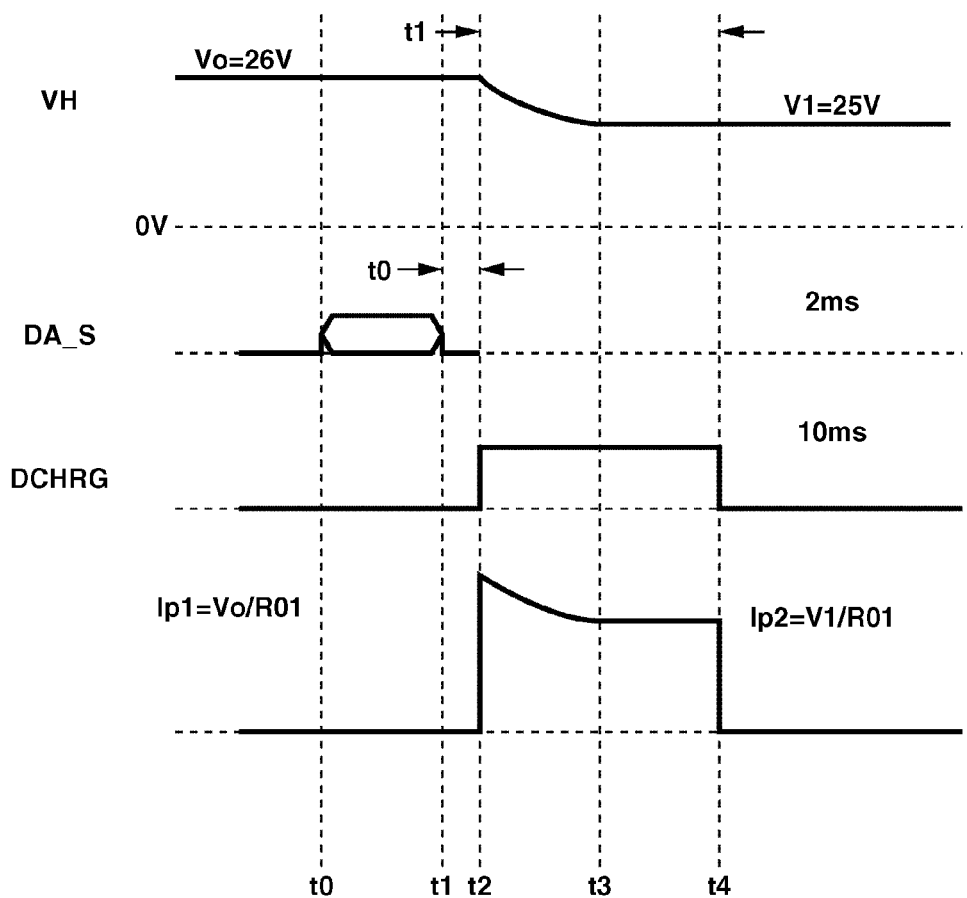
FIG. 10 is a waveform chart illustrating a waveform of the conventional DC-DC converter illustrated in FIG. 9.

In FIG. 1, the configuration except for the discharge circuit unit H is similar to that illustrated in FIG. 9. Therefore, a description is omitted here with regard to similar components. The configuration and operation of the discharge circuit unit H according to the present embodiment is described below.

The discharge circuit unit H illustrated in FIG. 1 is provided between a VH output terminal and an HGND terminal and includes a switch element Q01, a capacitor C01, a resistor R02 for charging the capacitor C01, and a resistor R03 for discharging the capacitor C01. The switch element Q01 includes, for example, a metal-oxide semiconductor field-effect transistor (MOS-FET).

One side of the resistor R02 is connected to a VH line and the other side of the resistor R02 is connected to the switch element Q01. One side of the switch element Q01 is connected to the resistor R02 and the other side of the switch element Q01 is connected to the resistor R03 and the capacitor C01. The resistor R03 and the capacitor C01 are connected in series to the HGND line. The switch element Q01 is turned ON/OFF in response to a DCHRG signal (discharge instruction) from the control unit 30.

The switch element Q01 becomes conductive when the DCHRG signal from the control unit 30 is at level H, whereas the switch element Q01 becomes nonconductive when the DCHRG signal from the control unit 30 is at level L. Thus, the switch element Q01 becomes ON when the DCHRG signal is at level H, whereas the switch element Q01 becomes OFF when the DCHRG signal is at level L. As described above, the ON/OFF of the switch element Q01 is performed according to the DCHRG signal. The control unit 30 outputs the DCHRG signal such that the OFF period (nonconduction period) of the switch element Q01 becomes longer than the ON period (conduction period) of the switch element Q01.

When the switch element Q01 is conductive, the resistor R02 transfers electric charge from the output capacitor C002 to the capacitor C01 to charge the capacitor C01. The resistor R02 serves to limit current flow when the switch element Q01 is conductive. The resistor R03 serves to discharge the electric charge of the capacitor C01 when the switch element Q01 is nonconductive.

Now, a case where the DC-DC converter 50, while it operates under a certain output voltage Vo, receives from the control unit 30 a setting signal (DA_S) to change the output voltage Vo to the output voltage V1 (Vo>V1) is described below with reference to waveforms illustrated in FIGS. 2 to 4.

Figure 2:
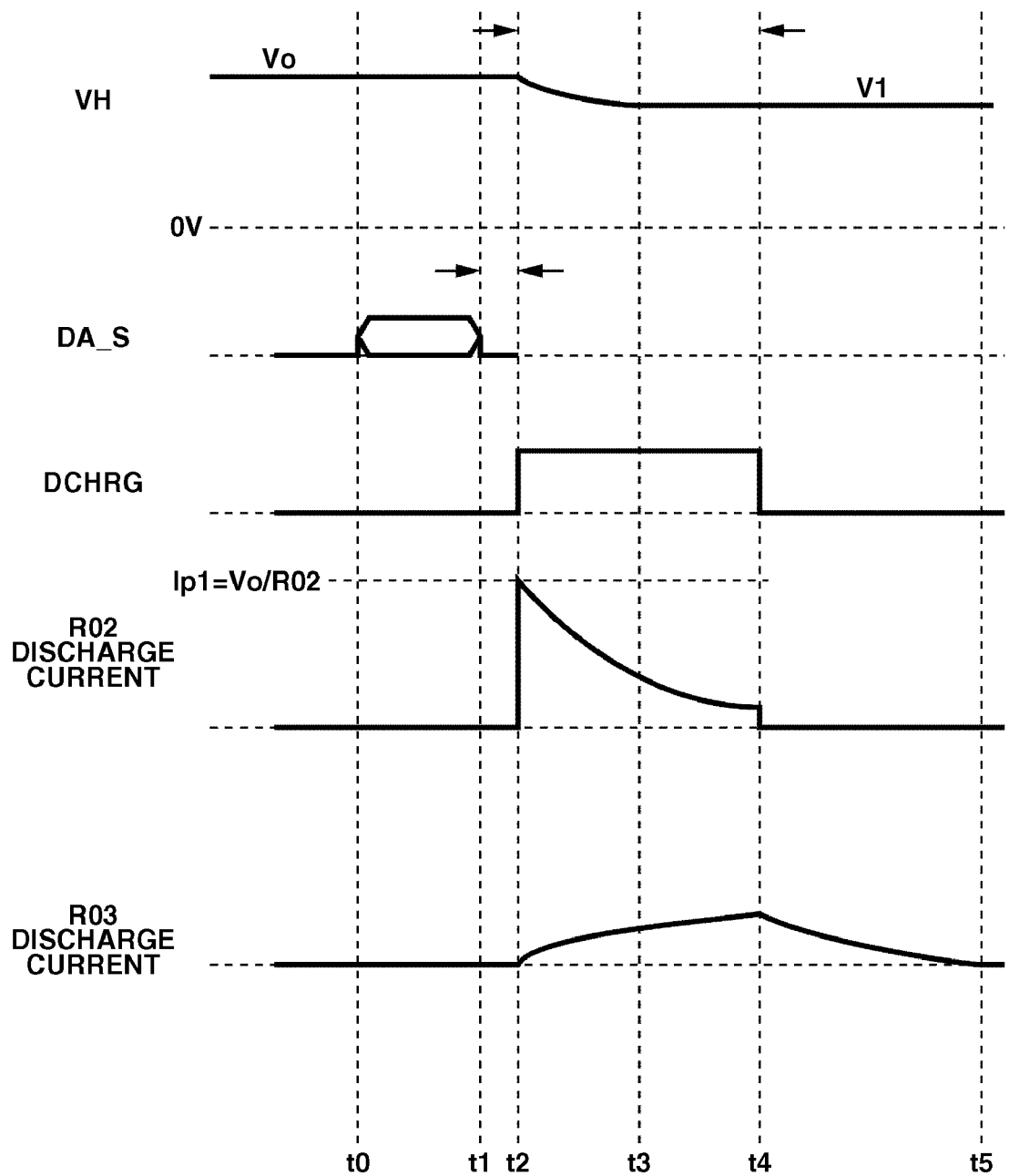
FIG. 2 is a waveform chart illustrating a waveform of each portion of the DC-DC converter illustrated in FIG. 1.

FIG. 2 illustrates waveforms in the DC-DC converter 50 illustrated in FIG. 1. FIGS. 3 and 4 illustrate a case where the circuit illustrated in FIG. 1 employs a circuit constant such that, for example, the resistor R02 is 22Ω, the resistor R03 is 100Ω, the capacitor C01 is 100 μF, and the capacitor C002 is 220 μF.

Figure 3:
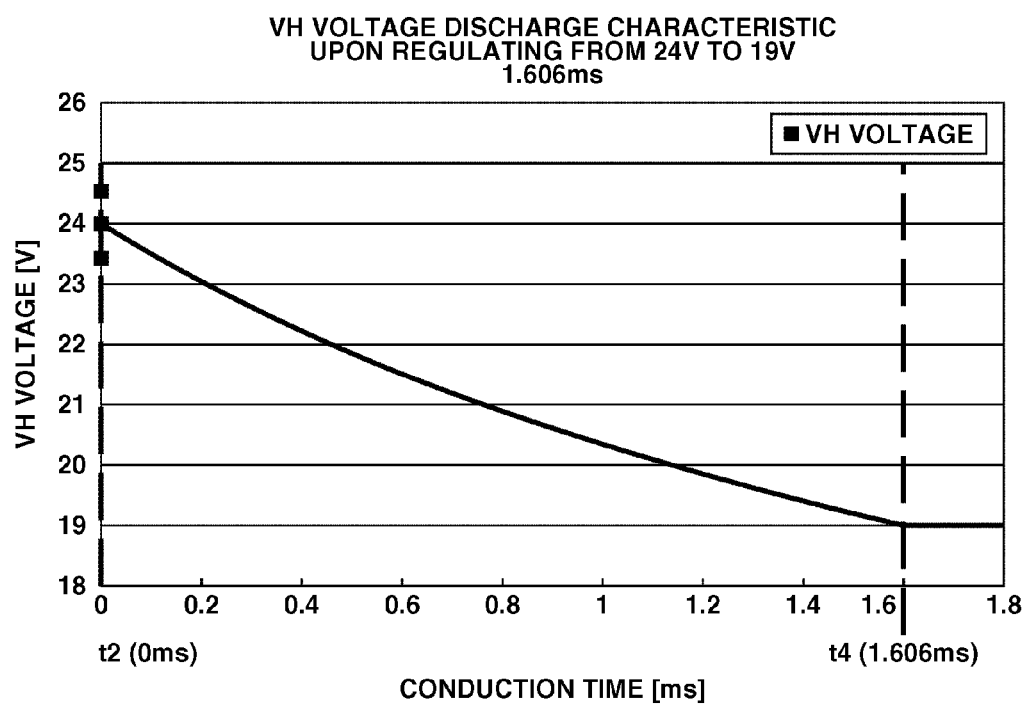
FIG. 3 is a waveform chart illustrating a case where an output voltage is changed from 24 V to 19 V with the DC-DC converter illustrated in FIG. 1.

Particularly, FIG. 3 illustrates a simulation of a pulse width of the DCHRG signal required for stepping down the output voltage VH from 24 V to 19 V. That is, FIG. 3 illustrates a pulse width for driving the discharge circuit unit H to step down the voltage in the whole output voltage range of the DC-DC converter 50 employing the above-described circuit constant. As a result of calculation in the simulation, the pulse width required for stepping down the output voltage VH from 24 V to 19 V is 1.606 ms.

Figure 4:
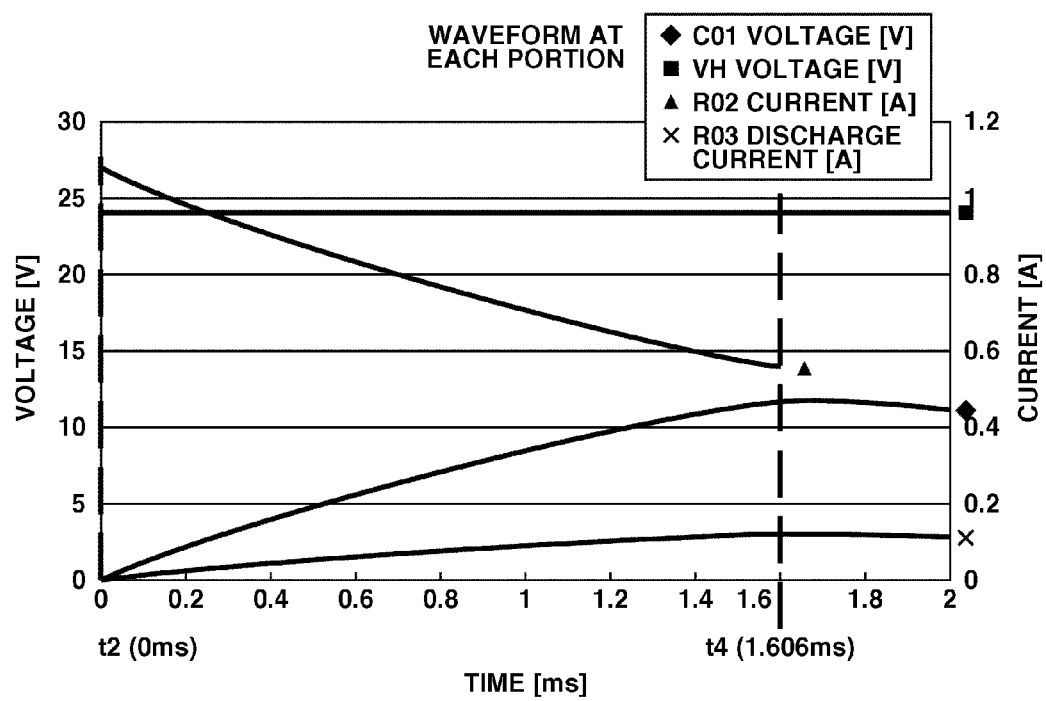
FIG. 4 is a waveform chart obtained by simulating a waveform of the DC-DC converter illustrated in FIG. 1.

FIG. 4 illustrates simulation waveforms of voltage and current at each portion for a time period from the moment when the DCHRG signal of the maximum pulse width (1.606 ms) obtained in FIG. 3 is input with the VH output kept at 24 V to the moment when a time of 2 ms elapses. Here, the VH output is kept at 24 V because a calculation of the maximum electric power is made proximately to a calculation of power to be applied to a resistor when the VH output is lowered by one bit of the D-A converter 201 from 24 V at a constant pulse width. More specifically, the curve illustrating a current flowing in the resistor R02 has no record at and after time t4. This is because the current flowing in the resistor R02 becomes zero since the switch element Q01 is nonconductive at and after time t4.

Figure 5:
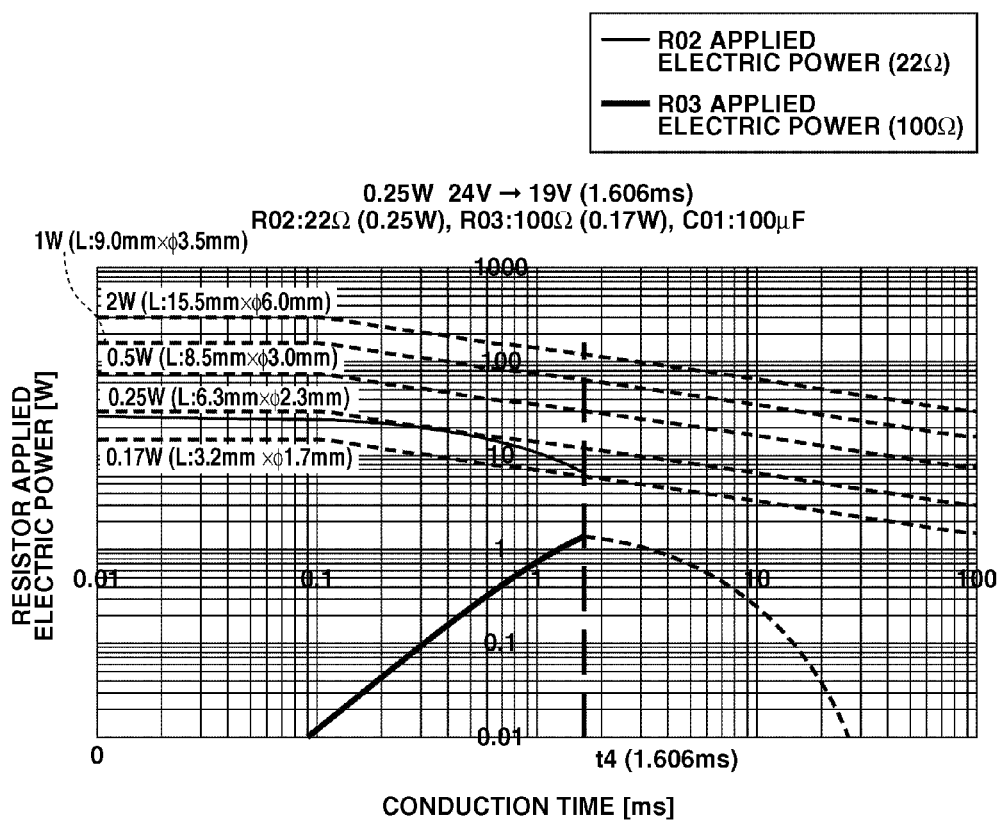
FIG. 5 is a waveform chart in which electric power to be applied to a discharge resistor by the DC-DC converter illustrated in FIG. 1 is plotted into pulse limiting electric power curves.

FIG. 5 illustrates a result of simulation of electric power to be applied to a discharge resistor. Assuming that load current of the DC-DC converter 50 is 0 A before the setting signal for changing the output voltage is received, the output voltage can be kept as it is if electric power of an amount that can compensate for an internal loss of the DC-DC converter 50 is supplied. Therefore, the switching element Q101 is in a state of duty 0% operation, namely, an OFF condition almost throughout a switching cycle.

Now, if the control unit 30 inputs a setting signal for changing the output voltage from Vo to V1 (Vo>V1) between time t0 and time t1 illustrated in FIG. 2, the output of the D-A converter 201 drops (not shown) to change the target setting voltage of the DC-DC converter 201.

Then, if the switch element Q01 receives a DCHRG signal at level H from the control unit 30 at time t2, the switch element Q01 becomes conductive. Here, since no load current is extracted from the output during a time period between time t1 and time t4, the VH voltage in a time period between time t1 and time t2 remains at Vo. Since the capacitor C01 is connected to the HGND line via the resistor R03, there is no electric charge accumulated in the capacitor C01. Therefore, when the switch element Q01 becomes conductive, charging current flows into the capacitor C01 via the resistor R02.

In this charging current, a potential applied to the resistor R02 becomes maximum immediately after the switch element Q01 becomes conductive as illustrated in FIG. 2. As understood from FIGS. 2 and 3, a peak current Ip1 of the current flowing in the resistor R02 is expressed by Ip1=Vo/R02 (provided that ON resistance of the switch element Q01 is 0Ω).

Accordingly, the electric potential of the capacitor C01 is gradually charged via the resistor R02 to increase at and after time t2. Since the target voltage of the constant voltage control circuit of the DC-DC converter 50 is changed to V1, no electric power is supplied while the output voltage is higher than the target voltage V1. Therefore, the electric potential of the capacitor C002 (VH2) comes to decrease from Vo to the target voltage value V1.

The capacitor C01 is electrically charged via the resistor R02 and, thus, the electric potential thereof increases, whereas the end-to-end voltage of the resistor R02 gradually drops and, thus, the current flowing in the resistor R02 decreases with time. As the electric potential of the capacitor C01 increases, the current proportional to the electric potential of the capacitor C01 flows in the discharge resistor R03, which discharges electricity to the HGND line.

Here, since the resistor R02 and the resistor R03 have a relationship of "R02<<R03" in resistance value, the current flowing in the resistor R03 is smaller than that in the resistor R02 in a time period between time t2 and time t4.

Then, when surplus electric charge of the capacitor C002 transfers to the capacitor C01 in a time period between time t2 and time t3, the output voltage VH is subjected to constant voltage control at the setting voltage Vo. In FIG. 2, the DCHRG signal is continuously output until time t4. If the DCHRG signal is kept at high level infinitely, the voltage Vc of the capacitor C002 is charged up to a value expressed by Vc=Vo×R03/R02+R03.

Also, a current Ir2 flowing in the resistor R02 and a current Ir3 flowing in the resistor R03 have a relationship of "Ir2=Ir3=Vo/(R02+R03)". The current values of the current Ir2 and the current Ir3 become constant to finally converge upon a constant value determined by the resistor voltage divider.

In other words, regarding a value of the output voltage VH, the current flowing in the resistor R02 becomes maximum at time t2 immediately after the discharge circuit unit H becomes conductive. Then, the value of the output voltage VH exponentially declines to a value expressed by 2 Vo/(R02+R03)". The current Ir3 flowing in the resistor R03 gradually increases at and after time t2 immediately after the discharge circuit unit H becomes conductive, and finally reaches the maximum value at time t4. Then, the electric charge accumulated in the capacitor C01 is discharged for a time period between time t4 and time t5. The time period between time t4 and time t5 is a period in which the capacitor C01 is not connected to the resistor R02. Namely, the switch element Q01 of the discharge circuit unit H does not operate during this period.

In FIG. 4, a voltage value applied to the resistor R02 becomes maximum at time t2 and then gradually drops. Furthermore, a voltage applied to the resistor R03 becomes maximum at time t4. At or after time t4 when the switch element Q01 is turned OFF, a voltage applied to the resistor R02 becomes 0 V since the switch element Q01 is OFF. Further, at or after time t4, the electric charge having been charged in the capacitor C01 is discharged to the HGND line via the resistor R03. Since the switch element Q01 is OFF, there is no path for charging the capacitor C01. Consequently, the voltage applied to the resistor R03 gradually becomes smaller.

Figure 11:
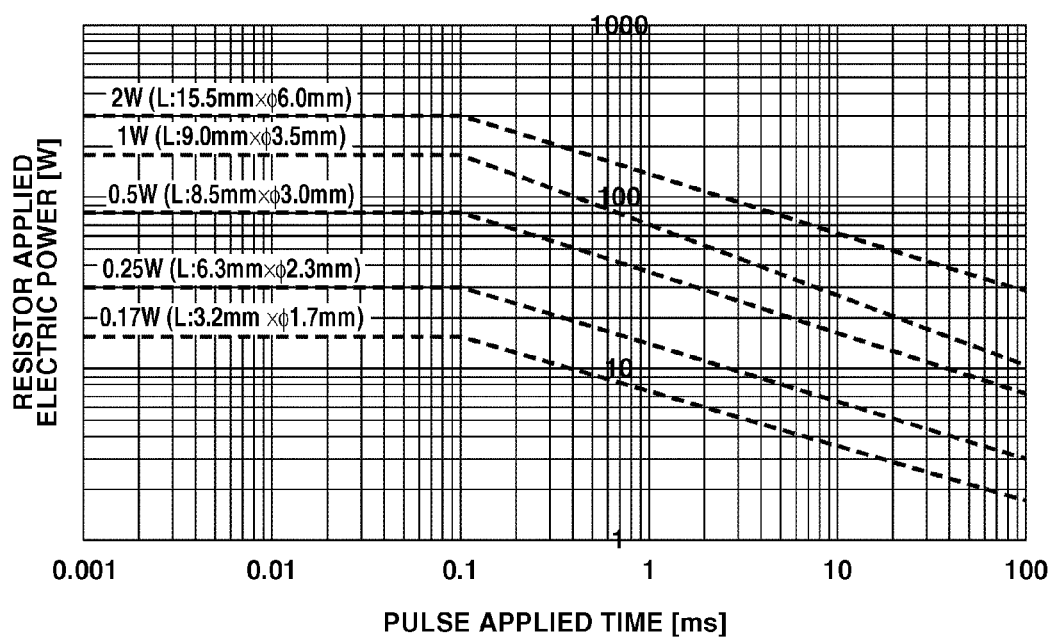
FIG. 11 is a waveform chart illustrating pulse limiting electric power curves of a discharge resistor.
Figure 13:
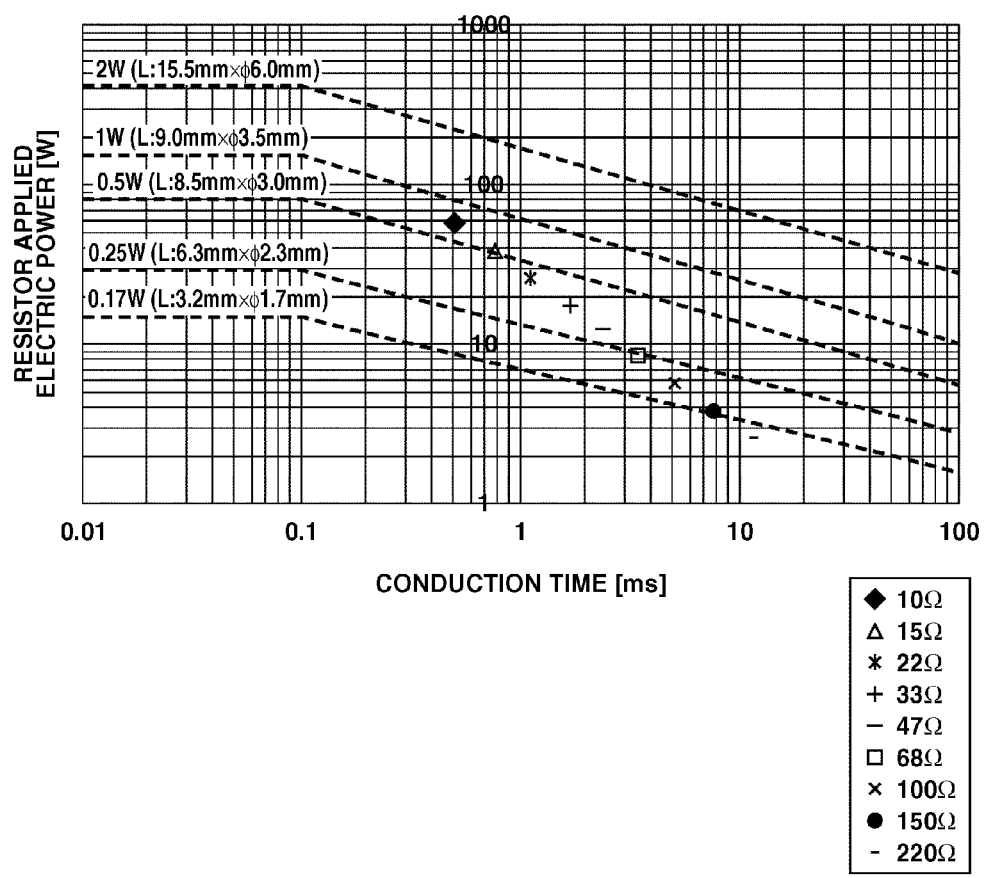
FIG. 13 is a waveform chart illustrating a discharge time and electric power applied to a discharge resistor plotted into pulse limiting electric power curves.

FIG. 5 is a graph obtained by plotting electric power applied to the resistors R02 and R03 based on the simulation result illustrated in FIG. 4 into the pulse limiting electric power curves similar to those illustrated in FIGS. 11 and 13. In FIG. 5, since the electric power curves are shown by a double logarithm, the electric power generated at the resistors R02 and R03 in a time period between 0.01 ms and time t4 is plotted.

As apparent from FIG. 5, it can be understood that the output voltage can be lowered at a pulse width of 1.606 ms with regard to the entire voltage range on the condition that the resistor R02 is 22Ω, the resistor R03 is 100Ω, and the capacitor C is 100 μF. The electric power of the resistor R03 becomes maximum at time t4 illustrated in FIG. 5 and, then, gradually drops after time t4 at which the switch element Q01 is turned OFF, thus resulting in a sufficiently low applied electric power with regard to the limiting electric power curve of 0.17 W in FIG. 5.

It can be seen from FIG. 5 that the resistor R02 is within a rated power of 0.25 W, the resistor R03 is within a rated power of 0.17 W, and thus the voltage value in the entire voltage range can be stepped down to the target voltage value with a pulse width of 1.606 ms.

To the contrary, a conventional circuit requires a discharge resistance of less than 33Ω and a resistor having a rated power of 0.5 W to regulate the entire voltage range with a pulse width of 1.6 ms, as illustrated in FIG. 13.

Figure 14:
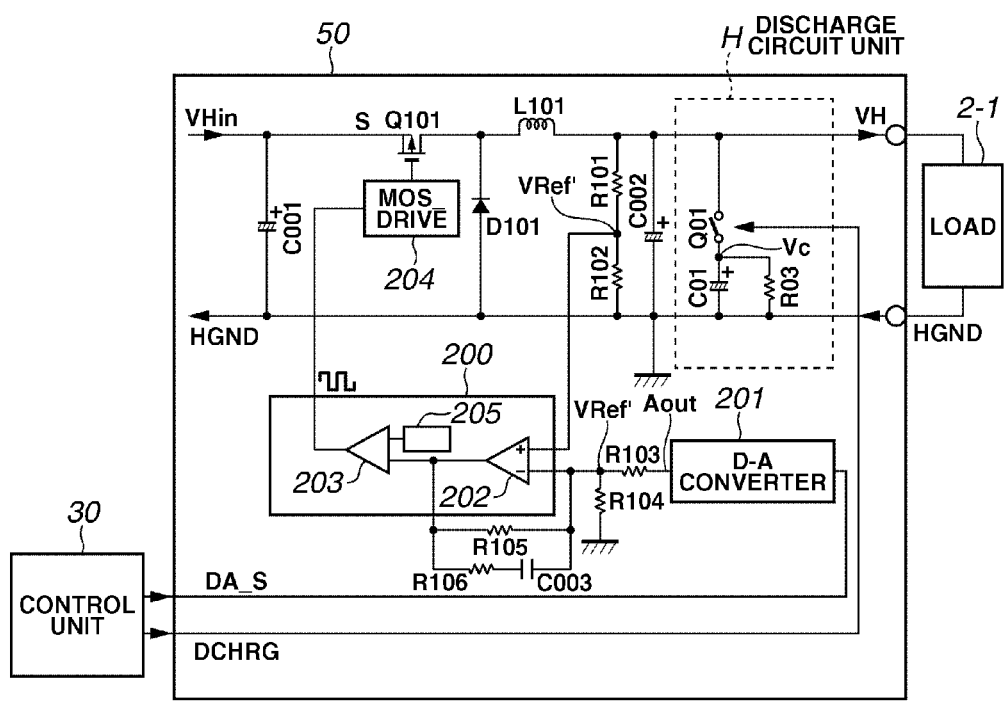
FIG. 14 is a circuit diagram of a modified exemplary embodiment of the DC-DC converter according to an exemplary embodiment of the invention.

In the above description, the resistor R02 is connected between the output of the DC-DC converter 50 and the switch element Q01, considering that the switch element Q01 has an ON resistance of 0Ω. A modified exemplary embodiment can have a configuration omitting the resistor R02, as illustrated in FIG. 14. In this configuration, the capacitor C02 can be charged by using the ON resistance of the switch element Q01 instead of the resistor R02.

In other words, the resistor R02 can be omitted from the discharge circuit unit H if the switch element Q01 can operate within an area of safe operation (ASO) by using the ON resistance of the switch element Q01 upon charging the capacitor C01.

The discharge resistor R03 does not require a large rated power since the capacitor C01 discharges electric charge during a nonconduction period of the discharge circuit unit H.

Here, it is sufficient that the capacitor C01 can transfer electric charge corresponding to the value of a dropping voltage ΔVH to the output capacitor C002 for the output voltage VH. For example, if the output voltage of the DC-DC converter 50 is in a range between the maximum value VHmax and the minimum value VHmin and if the maximum value of the setting voltage width is ΔVHmax and the capacitance of the capacitor C002 is C, the maximum value of surplus electric charge generated at the capacitor C002 when the output voltage is lowered by ΔVHmax from the maximum value VHmax is expressed by "ΔQmax=C×ΔVHmax/VHmax". Therefore, the capacitor C01 requires a capacitance more than two or three times of a ratio of ΔVHmax/VHmax with respect to the capacitance of the output capacitor C002.

For example, assuming such a case that the DCHRG signal is periodically output, it is sufficient that the resistor R3 can discharge electric charge of the capacitor C01 to the HGND line before the DCHRG signal reaches level H (in other words, within a time period for which the DCHRG signal is at level L). Consequently, a constant and a rated power value can be designed and selected on the condition that a time constant T of the capacitor C01 and the resistor R3 is less than a cycle for modulating the VH voltage. With regard to the DCHRG signal, such a configuration that the DCHRG signal is used upon increasing the output voltage can be employed. However, it is useful to receive the DCHRG signal only upon lowering the output voltage.

In FIG. 2, one discharging step (time t2 to t5) is preformed for one input of the setting signal. Alternatively, the discharging step (time t2 to t5) may be performed a plurality of times (for example, twice or three times).

Figure 8:
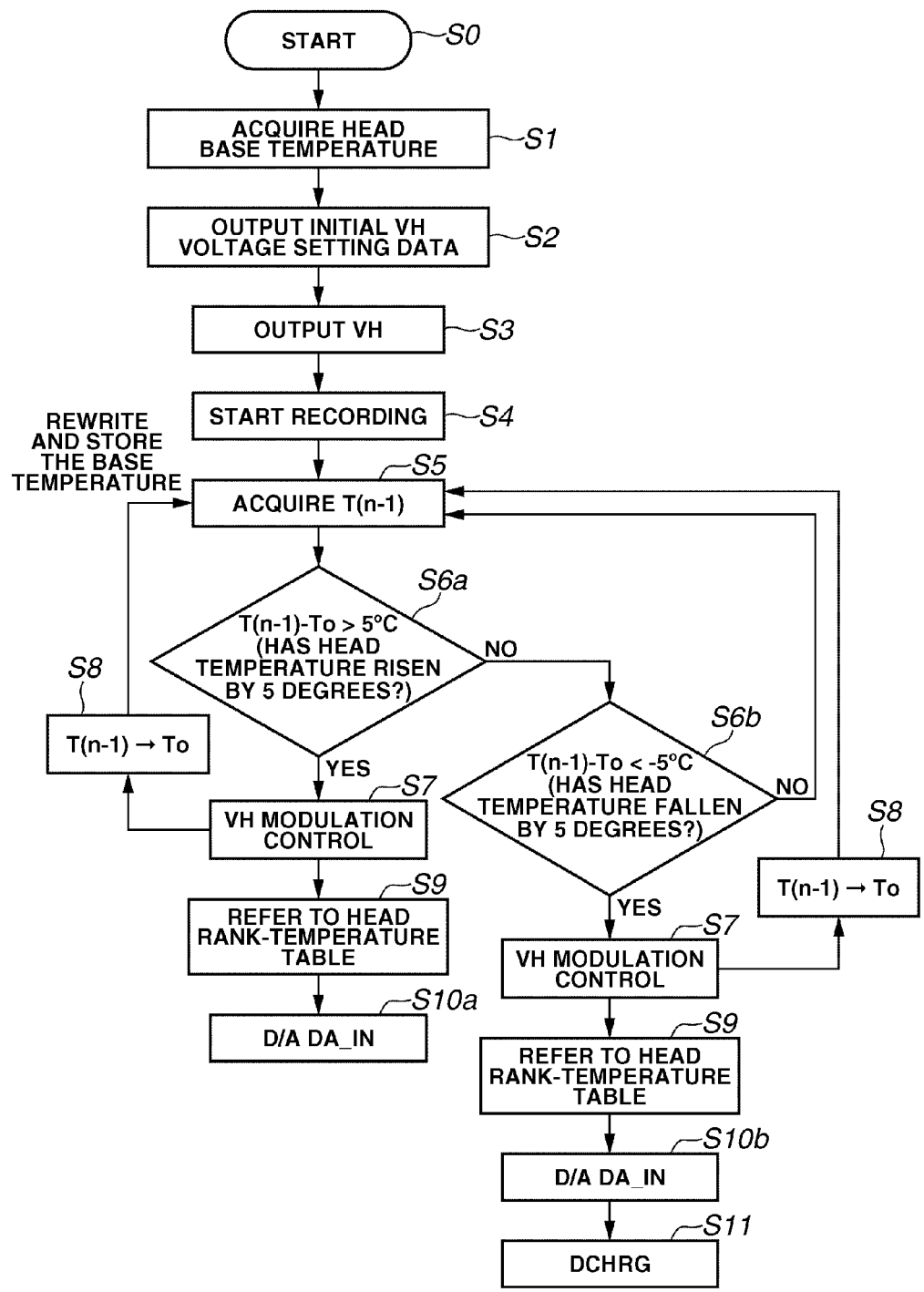
FIG. 8 is a flow chart illustrating an example control process for a power source of the recording apparatus according to an exemplary embodiment of the invention.

FIG. 8 is a flow chart illustrating an example of a recording head temperature detection timing and output voltage modulation control process in a recording apparatus with the above-described DC-DC converter 50.

When the recording apparatus is activated in step S0, then in step S1, the control unit 30 initially detects a head information signal, such as data representing ink discharge characteristic variation of the recording head, and then acquires temperature information of the recording head to store it as a base temperature.

Subsequently, in step S2, the control unit 30 transmits, to the DC-DC converter, voltage data for setting supply of the head driving voltage based on the information acquired in step S1.

When the recording apparatus is ready for recording, then in step S3, the control unit 30 outputs, to the DC-DC converter 50, a VH output enabling signal for starting a power source voltage of the recording head to allow the recording apparatus to start recording in step S4.

In step S5, the control unit 30 acquires the head temperature at regular intervals while performing recording. In steps S6a and S6b, the control unit 30 determines whether there is a temperature change of more than a predetermined temperature range between the base temperature To and the head temperature T(n−1) detected at regular intervals. In FIG. 8, the control unit 30 detects a temperature change of, for example, 5 degrees with regard to the base temperature To in steps S6a and S6b.

If there is a temperature change more than the predetermined temperature range (YES in steps S6a and S6b), then in step S7, the control unit 30 performs the VH modulation control and, in step S8, updates the base temperature (target temperature) from To to T(n−1). In step S9, the control unit 30 refers to a head rank-temperature table and, in step S10a or step S10b, transmits a setting value to the D-A converter 201.

Here, if the head temperature rises, the control unit 30 raises the voltage (driving voltage) VH and shortens the pulse width. With this control process, an ink discharge amount can be prevented from increasing according to the rising head temperature. On the other hand, if the head temperature falls, the control unit 30 lowers the voltage VH and elongates the pulse width. As described above, the control unit 30 controls and changes the driving voltage and the pulse width based on the head temperature.

When the head temperature rises, then in step S10a, the control unit 30 changes the output of the D-A converter 201. Namely, the control unit 30 raises the VH voltage of the DC-DC converter 50. Then, the control unit 30 terminates the control process.

On the other hand, when the head temperature falls, then in step S10b, the control unit 30 transmits a digital signal to the D-A converter 201. In step S11, the control unit 30 transmits the DCHRG signal to the discharge circuit unit H.

As described above, the control unit 30 transmits the DCHRG signal in step S11, thereby driving the switch element Q01 of the discharge circuit unit H. Accordingly, the control unit 30 charges the surplus electric charge of the output capacitor C002 of the DC-DC converter 50 to the capacitor C01 of the discharge circuit unit H, thereby enabling stepping down the VH voltage to the target voltage value in a short time period.

Step S11 and subsequent steps are described below with reference to FIG. 2. For example, the control unit 30 returns to step S5 to repeat the above-described sequence. For example, if the temperature continues to fall after time t5 (YES in step S6b), the control unit 30 performs the sequence from time t0 to time t5.

In FIG. 8, the head temperature is acquired at regular intervals as a sequence. However, the head temperature can be acquired at a breakpoint of an operation of the recording apparatus. For example, the control unit 30 can acquire the head temperature every one scan of the head carriage 3.

In the present embodiment, the switch element Q01 of the discharge circuit unit H becomes conductive in step S11, and thus the surplus electric charge of the output capacitor C002 is charged to the capacitor C01 of the discharge circuit unit H.

The electric charge charged in the capacitor C01 is discharged to the HGND line via the resistor R03 within a time period between the previous step S11 and the current step S11. Therefore, the time constant defined by the capacitor C01 and the resistor R03 is set to a value shorter than the time interval between the previous step S11 and the current step S11.

In the above description, the temperature change of a recording head is considered as a factor that may change the power source voltage. However, the factor for changing the power source voltage includes changing the size of an ink droplet to be discharged, in addition to the temperature change of a recording head. In such a case, for example, a similar discharge control operation is performed in reducing the size (ink amount) of an ink droplet.

In the above-described exemplary embodiment, the discharge circuit unit H is located within a substrate mounted on the head carriage 3, on which the DC-DC converter 50 is installed. However, the discharge circuit unit H can be configured with elements that can be formed on a silicon wafer on which a recording head is formed.

As described above, according to the present exemplary embodiment, the surplus electric charge of the output capacitor C002 is charged to the capacitor C01 of the discharge circuit unit H when the switch element Q01 of the discharge circuit unit H becomes conductive. Then, the electric charge charged in the capacitor C01 is discharged to the ground HGND via the resistor R03 during a nonconduction period of the switch element Q01, which is longer than the conduction period of the switch element Q01.

While the present invention has been described with reference to exemplary embodiments, it is to be understood that the invention is not limited to the discussed exemplary embodiments. The scope of the following claims is to be accorded the broadest interpretation so as to encompass all modifications, equivalent structures, and functions.

This application claims priority from Japanese Patent Application No. 2007-091033 filed Mar. 30, 2007, which is hereby incorporated by reference herein in its entirety.

What is claimed is:

1. A power supply device comprising:
   a DC-DC converter configured to regulate an output voltage based on an externally input instruction; and
   a discharge circuit connected to an output capacitor of the DC-DC converter, wherein the discharge circuit includes,
      a switch element configured to switch between a conductive state and a nonconductive state according to an instruction; and
      a capacitor-resistor (C-R) circuit configured to charge electric charge accumulated in the output capacitor of the DC-DC converter when the switch element is conductive and to discharge the electric charge to ground while the switch element is nonconductive.

2. The power supply device according to claim 1, wherein one end of the switch element is connected to an output voltage line of the DC-DC converter via a first resistor and the other end of the switch element is connected to the C-R circuit.

3. The power supply device according to claim 2, wherein the C-R circuit includes a resistor and a capacitor connected in series between the other end of the switch element and the ground.

4. The power supply device according to claim 1, wherein one end of the switch element is connected to an output voltage line of the DC-DC converter and the other end of the switch element is connected to the C-R circuit.

5. The power supply device according to claim 4, wherein the C-R circuit includes a resistor and a capacitor connected in series between the other end of the switch element and the ground.

6. The power supply device according to claim 2, wherein a time constant of the C-R circuit is smaller than an interval of conduction timing of the switch element.

7. A power supply device comprising:
a DC-DC converter configured to regulate an output voltage based on an externally input instruction; and
a discharge circuit connected to an output line of the DC-DC converter, wherein the discharge circuit includes,
   a switch element configured to switch between a conductive state and a nonconductive state according to an instruction; and
   a capacitor-resistor (C-R) circuit configured to charge electric charge of an output capacitor of the DC-DC converter when the switch element is conductive and to discharge the electric charge to ground when the switch element is nonconductive.

8. A recording apparatus comprising:
a power supply device including,
   a DC-DC converter configured to regulate an output voltage based on an externally input instruction; and
   a discharge circuit connected to an output capacitor of the DC-DC converter, wherein the discharge circuit includes,
      a switch element configured to switch between a conductive state and a nonconductive state according to an instruction; and
      a capacitor-resistor (C-R) circuit configured to charge electric charge accumulated in the output capacitor of the DC-DC converter when the switch element is conductive and to discharge the electric charge to ground while the switch element is nonconductive; and
a control unit configured to control an operation of the recording apparatus, wherein the control unit outputs an instruction for changing the output voltage to the DC-DC converter and the discharge circuit.

9. A recording apparatus comprising:
a power supply device including,
   a DC-DC converter configured to regulate an output voltage based on an externally input instruction; and
   a discharge circuit connected to an output capacitor of the DC-DC converter,
   wherein the discharge circuit includes,
      a switch element configured to switch between a conductive state and a nonconductive state according to an instruction; and
      a capacitor-resistor (C-R) circuit configured to charge electric charge accumulated in the output capacitor of the DC-DC converter when the switch element is conductive and to discharge the electric charge to ground while the switch element is nonconductive; and
a control unit configured to control an operation of the recording apparatus, wherein the control unit outputs an instruction to the switch element such that a nonconduction period of the switch element becomes longer than a conduction period of the switch element.

10. A recording apparatus comprising:
a power supply device including,
   a DC-DC converter configured to regulate an output voltage based on an externally input instruction; and
   a discharge circuit connected to an output line of the DC-DC converter, wherein the discharge circuit includes,
      a switch element configured to switch between a conductive state and a nonconductive state according to an instruction; and
      a capacitor-resistor (C-R) circuit configured to charge electric charge of an output capacitor of the DC-DC converter when the switch element is conductive and to discharge the electric charge to ground when the switch element is nonconductive; and
a control unit configured to control an operation of the recording apparatus, wherein the control unit outputs an instruction for changing the output voltage to the DC-DC converter and the discharge circuit.

* * * * *